Oct. 7, 1952      J. G. HAWLEY      2,612,969
BRAKE
Filed Sept. 13, 1946      3 Sheets-Sheet 3
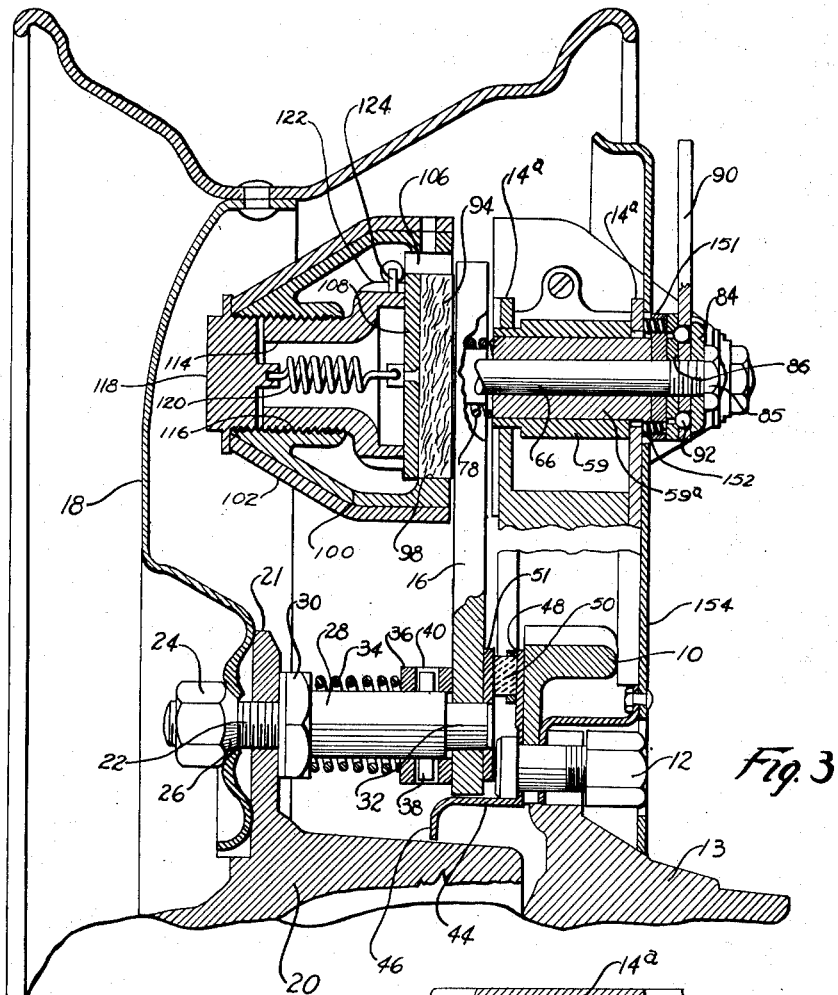
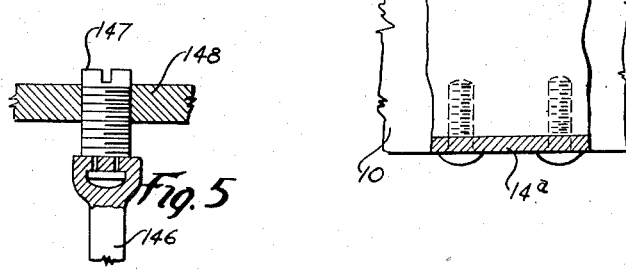
INVENTOR
Jesse G. Hawley
ATTORNEYS
Oldham & Oldham Patented Oct. 7, 1952

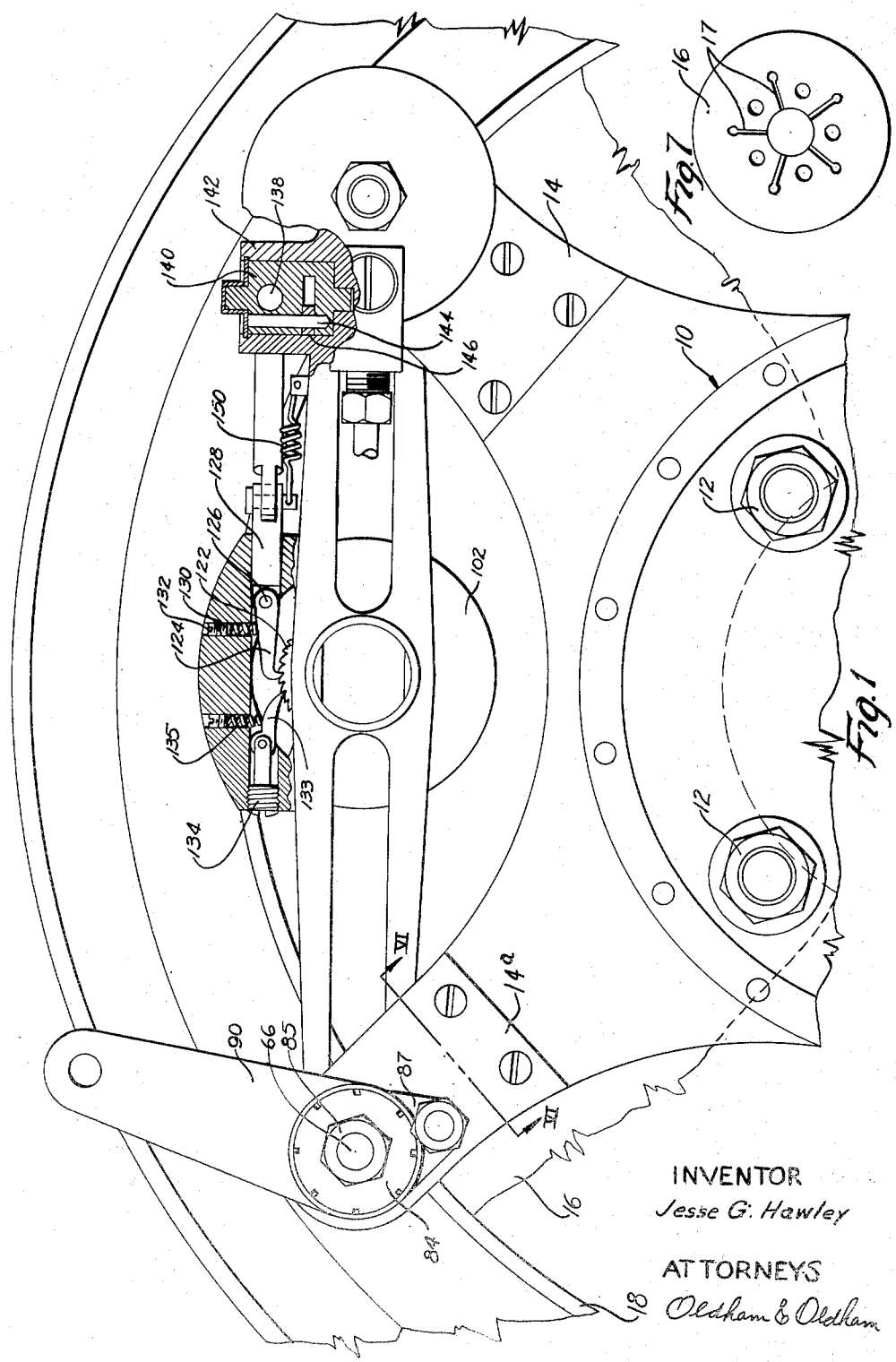

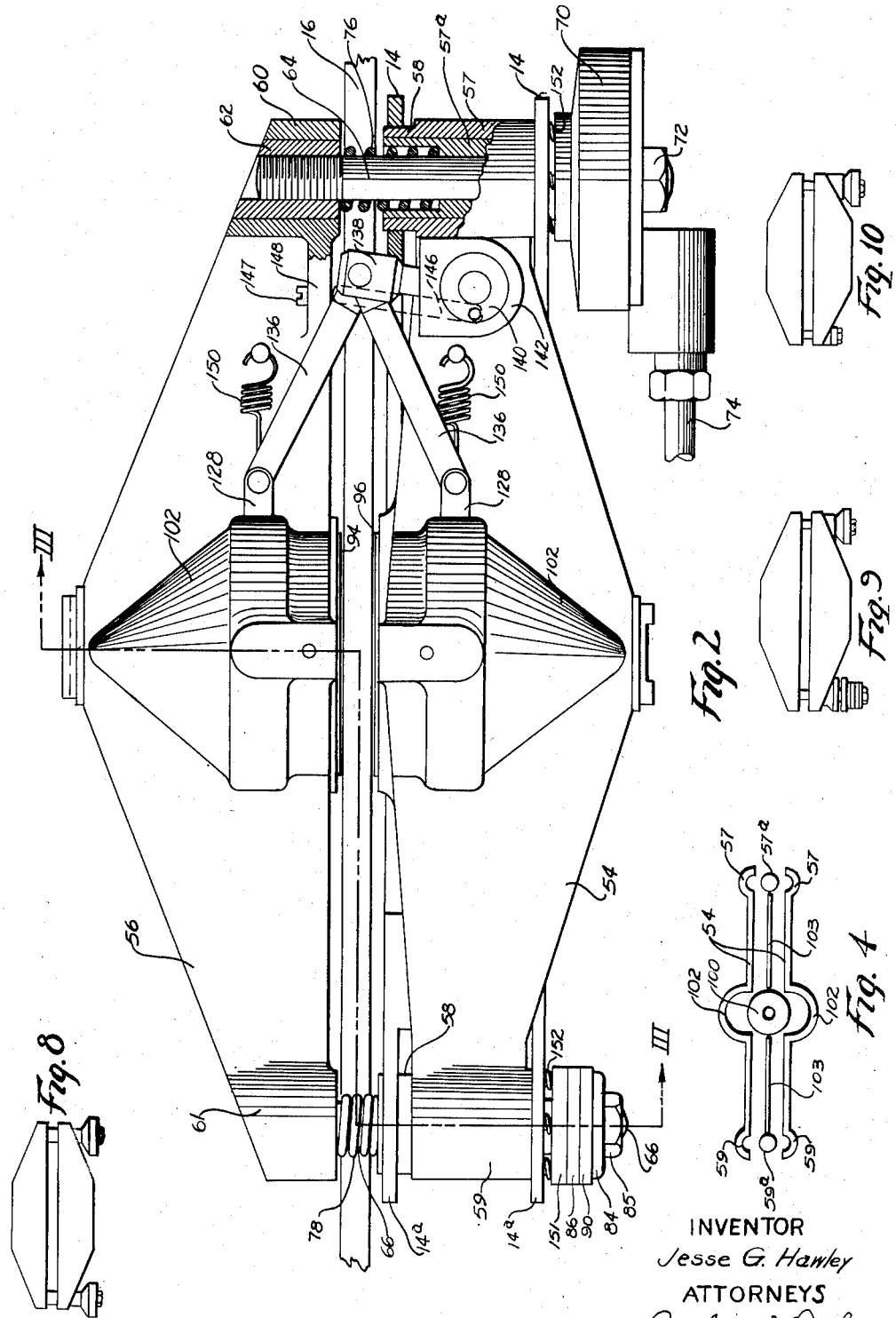

2,612,969

UNITED STATES PATENT OFFICE 2,612,969

BRAKE

Jesse G. Hawley, Painted Post, N. Y., assignor to Hawley Brake Corporation, Bath, N. Y.

Application September 13, 1946, Serial No. 696,634

19 Claims. (Cl. 188—72)

This invention relates to brakes, and, more particularly, to brakes for use on vehicles such as automobiles.

Heretofore, bakes of various types have been provided for vehicles and particularly automobiles. The average automobile owner and operator feels that his brakes are quite a satisfactory part of his automobile and can be relied upon to operate over a considerable period in the life of the automobile with a minimum of attention and repair, and with a maximum of reliability. However, experienced automobile engineers, brake engineers and brake manufacturers recognize many of the shortcomings of the average automobile brake. For example, if the car owner will drive in low gear with his brakes partially set, the braking fluid will soon vaporize to the point where no braking action of satisfactory character can be obtained.

Again, if a series of stops are made from high speed to a dead stop only a relatively small number of repetitions are required before the conventional braking means on an automobile becomes inoperative. Furthermore, conventional and other known types of vehicle brakes do not provide the smooth, effortless and yet quick stop demanded by the automobile engineers, and it is within the experience of every automobile driver to have the frictional coefficient of his brakes change due to change in weather conditions from hot to cold and from wet to dry. Moreover, the conventional brake is not inexpensive, and it is a rather involved operation to adjust the brake as wear occurs, or to reline the brakes after the friction material is objectionably worn.

Again, it has been conventional practice to employ self-energizing characteristics in substantially all automobile brakes, and this means uncontrolled brake action which is apt to be dangerous.

Moreover, even though the automobile companies and engineers have believed that automobile axle housings are rigid and that the wheels and axles are free of end play, I have discovered that many braking difficulties arise because of these heretofore unknown and unappreciated variables.

It is the general object of my invention to avoid and overcome the foregoing and other difficulties of and objections to conventional and known vehicle and automobile brakes by the provision of an improved, relatively inexpensive, easily operated brake characterized by smoothness and positiveness of operation under substantially all conditions of weather and temperature, ease of relining, and by automatic wear adjustment.

Another object of the invention is to provide a brake structure wherein the rotative and non-rotative parts of the brake are held in correct alignment to insure proper clearance regardless of axle or axle housing distortion, axle or wheel end play or camber, or other changes due to the torque, forces or stresses to which the brake or vehicle are subjected in use.

Another object of my invention is to provide a brake structure in which oil, grease, braking fluid or foreign matter on the linings have little or no adverse effect on the brake action.

Another object of my invention is to provide an improved brake of the character described wherein hydraulic means are utilized to energize the brake in its normal operation, and mechanical means may be employed to energize the brake to effect a parking brake action.

Another object of my invention is the provision of a vehicle brake including automatic wear compensating means which insure the same operative stroke of the foot pedal by the operator during the entire life of the brake lining.

Another object of my invention is the provision of an improved vehicle brake characterized by having substantially all parts made as stampings or screw machine products to facilitate manufacture and reduce the cost of the brake.

Another object of my invention is the provision of a single disc, double beam type of brake with spots or plugs of friction material carried at the centers of the beams which engage with opposed sides of the disc.

Another object of my invention is to provide an improved automobile brake which will still be functioning when subjected to the very severe test of a series of quick stops from high speed, or of driving for a considerable distance with the brake partially set.

Another object of my invention is to provide a brake for automobiles which brake is characterized by being completely operator-controlled without any self energizing characteristics, all of which is advantageous from a safety and smoothness standpoint.

Another object of my invention is the provision of a brake construction of the character described wherein the heat generated by the braking action is at a point sufficiently removed from the braking fluid as to prevent vaporization thereof even under very severe operating conditions.

The foregoing objects of my invention, and other objects which will become apparent as the description proceeds, are achieved by the provision of a vehicle brake including a rotary disc, a pair of brake beams, one beam being positioned on each side of the disc, the ends of the beams extending beyond the periphery of the disc, hydraulic means at one end of the beams for moving the center portion of the beams into engagement with the disc, mechanically actuated cam means may be utilized at the other end of the beams for moving the center portions of the beams into engagement with the disc to effect parking brake action, friction plugs adjustably carried near the center of the brake beams, and means operated by the clearance between the beams for periodically advancing the friction plugs towards the disc as the surfaces of the plugs wear in use.

For a better understanding of my invention reference should be had to the accompanying drawings, wherein:

Fig. 1 is a side elevation partly broken away, of the improved brake of my invention;

Fig. 2 is a plan view, partially broken away, of the brake illustrated in Fig. 1;

Fig. 3 is a radial cross-sectional view illustrating the details of the brake shown in the other two figures. This sectional view is taken substantially on the line III—III of Fig. 2;

Fig. 4 is an exploded side view of a beam member, on reduced scale, illustrating the manner of making up the beam from stamped and screw machine parts;

Fig. 5 is a fragmentary view of the means connecting the beams to effect operation of the means for automatically compensating for brake wear;

Fig. 6 is a fragmentary cross-sectional view taken on line VI—VI of Fig. 1 and illustrates the construction of the arms 14 and 14ᵃ which mount the brake beam 54;

Fig. 7 is a side elevation, on reduced scale, of the brake disc incorporated in the improved brake assembly; and Figs. 8, 9, and 10 are diagrammatic plan views on reduced scale of modifications of the invention illustrating alternate operating means.

Referring to the drawings, the numeral 10 indicates a stationary bracket which is adapted to be secured, as by bolts 12, or other means, to the axle housing 13, or to the axle in a non-rotative manner. The bracket 10 is formed with a double pair of radially directed circumferentially spaced arms 14 and 14ᵃ which extend in spaced relation to a disc 16 mounted to rotate with the wheel 18. The bracket 10 and the arms 14 and 14ᵃ are preferably made in production as heavy stampings having integral strengthening ribs or flanges (not shown). The brake disc 16 is of any desired material usually metal, for example, cast iron, and may be made of any of a variety of thicknesses, but preferably is relatively thick, for example, over ¼" and up to ½" or more, so that it is substantially non-warping. Also, it is advisable to provide a plurality of radially directed slots 17 therein to avoid strain or warping when the outer portion of the disc becomes heated and expands during braking action.

An important feature of the invention is that the wheel 18 is adapted to be removably mounted on a hub member 20 without affecting the braking disc 16, and with the wheel being constructed to substantially enclose the braking mechanism and the disc 16. This is achieved in the manner best illustrated in Fig. 3 which shows that the wheel member 18 is secured to the hub 20 by screw studs 22 threaded into the flange 21 of the hub 20, which screw studs receive nuts 24 formed with conventional conical ends 26 engaging with dimpled seats formed around the stud receiving holes of the wheel. The screw studs 22 are usually formed integral with round stud pins 28, having hex portions 30 which are turned down tight against the flange 21 on the hub 20. The ends of the stud pins 28 are formed of reduced diameter, as at 32, and are slidably received in suitable holes spaced circumferentially of the inner periphery of the disc 16.

Another important feature of the invention is to maintain proper clearance between the rotary and non-rotary parts of the brake, specifically between the disc 16 and the brake members. In prior art devices difficulties of clearance have been caused by axle end play, axle camber, axle housing bending, wheel camber, and the like. To maintain proper brake clearance in spite of the noted variables each stud pin 28 has means associated therewith for resiliently holding the disc 16 in position. These means may conveniently take the form of a compression spring 34 positioned over each stud pin 28 which spring engages at one end with the hex 30, and at its other end with a collar 36 which is forced against the side of the disc 16 by the spring. In order to limit the travel of the collar 36 a pin 38 may be positioned transversely of the stud pin 28, and with the ends of the pin 38 engaging in diametrically opposed slots 40 in the collar 36. Or, alternatively, the collars 36 and pins 38 may be omitted and the springs 34 may be cut or shimmed to proper length and allowed to engage directly with the side of the disc 16.

Completing the mounting of the wheel 18 and hub 20, I preferably include a grease and dirt guard 44, of ring shape, held in position upon the bracket 10 by the bolts 12 which serve to secure the bracket 10 to the axle or housing 13. The guard 44 has an endless flange 46 extending into close proximity to the hub 20, and a second endless flange and aligning portion 48 of rigid character which holds a thrust bearing, or, as shown, ring-forming arcuate portions of anti-friction material 50, such as pressed bronze or graphite, in sealing engagement with the side of the disc 16. The anti-friction material 50 is formed in arcuate portions to allow the flow of cooling air therebetween. To further increase the anti-friction characteristics of the engagement, I may provide a chrome-plated disc 51, having slots like the slots 17, which is secured on the side of the disc 16. The anti-friction ring 50 provides a bearing surface supported by the axle housing 13 against which the disc 16 is continuously aligned. Or, as noted, instead of using an anti-friction bearing ring of the type illustrated I may employ a roller or ball thrust bearing, one race of which is secured to the disc 16 and the other race secured to the bracket 10.

The arms 14 and 14ᵃ, each of which has spaced-apart portions as best seen in Figs. 2 and 6, support a pair of beams 54 and 56, and this is conveniently accomplished by providing cylindrical bosses 58 at each end of the beam 54 which are slidably received in suitable apertures in the spaced-apart portions of arms 14 and 14ᵃ so that the beam 54 will be non-rotative with respect to the arms, but with the beam 54 being adapted to be held for limited movement toward and from the disc 16, all as best seen in Fig. 2. To achieve clearance and alignment compression springs 152 resiliently hold the beam 54 away from the disc 16 to the limit of movement of the bosses 58 in the arms 14 and 14ᵃ, as hereinafter more fully described. The springs 152 may surround the bosses 58 and 59 or the springs may, as shown, comprise a plurality of smaller diameter springs positioned at circumferentially-spaced points around each boss. This is achieved, as seen in Fig. 3, by carrying the springs 152 in a collar 151.

Each of the beams 54 and 56 is preferably made up from stamped sheet metal and screw machine parts, with the stamped sheet metal and screw machine parts being assembled together by riveting or by furnace brazing.

Fig. 4 illustrates the manner of forming beam 54 from stamped and screw machine parts, it being understood that Fig. 4 illustrates in exploded form the parts of the beam prior to assembly of the parts together. For example, the beam 54 includes opposed portions made from stamped sheet metal to the contours shown including end bosses 57 and 59, and a central conical boss 102. Secured between the stamped halves are stamped filler plates 103, plugs 57a, 59a, and a conical plug or cone 100. The beam 56 is made in a like manner.

The ends of the beam 56 are formed with bosses 60 and 61, each of which carries an internally threaded plug 62. Bolts 64 and 66 extend from the ends of the beams 54 into threaded engagement with the plugs 62 in the bosses 60 and 61 of the beam 56. It will be recognized from Fig. 1 of the drawings that the bolts 64 and 65 connecting the ends of the beams together are positioned just radially outside of the outer periphery of the disc 16.

Means are provided in association with the bolt 64 and the boss 57 and its associated plug 57a to effect relative movement between the bolt and plug and these means take the form of a liquid pressure motor 70 which engages between the head 72 of the bolt 64 and the plug 57a. Fluid under pressure is supplied to the fluid pressure motor 70 by a conduit 74.

A compression spring 76 is incorporated in the structure between plugs 57a and 60 (see Fig. 2) for effecting the normal return movement of the beam ends to their spaced apart position.

The other ends of the beams 54 and 56, connected together by the bolt 66 are normally held apart by the compression spring 78. Cam means are associated with the bolt 66 to effect movement of the beam ends together. Specifically, the bolt 66 carries a washer nut 84 and a nut 85 which are locked to each other on the bolt 66. As best seen in Fig. 3, the washer 84 engages with the side of a lever 90 which is provided with a plurality of circumferentially spaced holes each one of which receives a ball bearing 92. The ball bearings normally ride down in detents formed in the side of a circular member 86 which to prevent rotary movement has an ear 87 bolted to the cover plate 154 hereinafter described. Thus, when the lever 90 is rotated relative to the beam 54, which can be achieved by any desired mechanical or hydraulic means, such as the parking brake lever in the automobile, the balls 92 will ride out of the detents in the end of the member 86 to thereby displace the bolt 66 relative to the end of the beam 54 to move the ends of the beams 56 and 54 together with a cam-like action to effect a desired parking brake action.

It is to be specifically noted that instead of having hydraulic means at one end of the beams and mechanical operating means at the other, I may use hydraulic means, such as described, for simultaneously moving both ends of the beams together. See Fig. 8. Or again, as in Fig. 9, I may employ the double hydraulic means and use, also, a mechanically operated parking brake, such as described, in association with one of the hydraulic means. Furthermore, I may use only one hydraulic means and no mechanical means for operating, in the manner diagrammatically shown in Fig. 10.

Each one of the beams 54 and 56 carries a plug or body of friction material which is adapted to engage in braking engagement with the disc 16 upon movement of either ends of the beams together. In Fig. 2, the numerals 94 and 96 identify the plugs of friction material, and as best illustrated in Fig. 3, each plug of friction material is adapted to be slidably received in a counterbore 98 of a conical member 100 which is secured in the conical bosses 102 formed near the centers of each part of the beams 54 and 56.

Inasmuch as the mounting of each frictional plug is identical, only one will be described. Specifically, the plug 94 of friction material is held against rotating in the counterbore 98 by a pin 106 which engages one-half with the plug 94 and one-half with the cone member 100. The plug of friction material 94 is usually secured to a metal backing or base 108, as by cement, or vulcanization.

Now in order to provide for outward movement of the plug 94 towards the disc 16 as the plug 94 wears in use, I provide a tubular plug or stop 114 which engages at one end with the back of the plate 108, and which has its other end threaded as at 116 and screwed into a suitably tapped hole in the cone member 100. A cap member 118 is adapted to screw down into the end of the threaded core on the cone member 100, and a tension spring 120 is connected between the cap 118 and the backing plate 108 in engagement with the end of the plug or stop member 114. To increase friction between the stop 114 and the cone member 100 to prevent undesired turnback of the stop the spring 120 is made fairly strong.

Means are provided to automatically advance the plug or stop 114 as wear on the friction plug 94 occurs, and such means conveniently comprise a plurality of circumferentially spaced teeth 122 on the larger end of the stop member 114, with the teeth 122 being adapted to be engaged, as best shown in Fig. 1, by a pawl 124 pivotally mounted, as at 126, to the end of a plunger pin 128 slidably mounted in the beam. A spring 130 carried by a closure screw 132 serves to resiliently hold the pawl 124 in engagement with the ratchet teeth 122, or spring means for like purpose may be incorporated with the pivotal support of the pawl 124 on the plunger pin 128. To prevent return movement of the ratchet teeth 122 a pawl 133 carried by a screw 134 and held in contact by a spring 135 may be utilized. A spring 150 normally holds the plunger pin 128 in its outermost position. Each of the plunger pins 128 are adapted to be pivotally secured by connector links 136 with a crank arm 138 rigidly secured to a post 140 mounted for pivotal movement about a vertical axis in an upstanding boss 142 on the beam 54.

Pivotally fastened by a pin 144 to one side of the vertical axis of the post 140 is a link 146 which extends into pivotal engagement with a screw 147 (see Fig. 5) adjustably mounted in a flange 148 formed on the beam 56. Thus, as the beams 56 and 54 move together under the action of the pressure cylinder 70, the link 146 rotates the post 140 to throw the crank arm 138 in the direction to move links 136 to cause plunger pins 128 to move inwardly to cause pawls 124 to ride at least part way up on the next ratchet tooth 122. If the friction plugs 94 and 96 are not sufficiently worn the ends of the beams 54 and 56 will not move sufficiently far enough together to allow the pawls 124 to ride over the tops of the next ratchet tooth 122, and as the ends of the beams 54 and 56 move apart again each pawl 124 will slide back down the inclined surface of its associated ratchet tooth without movement of the stop 114. However, when the plugs 94 and 96 of friction material become sufficiently worn the movement of each pawl 124 will result in the hook of the pawl passing over the end of the next ratchet tooth 122, whereupon the return movement apart of the ends of the beams will result in the plunger pin 128, under the action of tension spring 150, causing the rotation of the stop 114 to screw the stops out a partial turn in the cone 100 to thereby move the backing plate 108 and the friction plug 94 outwardly toward the disc 16 to thereby compensate for any wear which has occurred in the plug.

Regardless of how rigidly the beams 54 and 56 are constructed, there is some resiliency and bending therein when subjected to load, and it is necessary to compensate for this by making the pin 138 of such length that when the beams are subjected to operating loads the point of pivotal connection between the pin 138 and the links 136 is at the center of the disc 16. This insures uniform wear compensating action on the friction plugs.

As seen in Fig. 3, a cover plate 154 held in place by the bolts 12, may be used to cover the inboard side of the brake assembly.

The procedure in replacing worn lining in the brake is as follows: First, the wheel 18 and the hub 20 are removed from the wheel axle; then the nuts 72 and 85 are accessible and are removed; the outboard beam 56 can then be slid away from the disc 16 after the pin between the link 136 and plunger pin 128 is removed; the disc 16 is then removed; the old plugs 94 of friction material are then removed and after the stops 114 are rotated back to their initial positions new plugs 94 including new backing plates 108 are inserted; whereupon the procedure is reversed to reassemble the combination.

From the foregoing it will be recognized that the various objects of the invention have been achieved by the provision of a relatively simple, inexpensive, easily operated, beam type brake adapted for automobiles and other vehicles, and characterized by smoothness and positiveness of operation, freedom from maintenance and adjustment problems, and simplicity of replacing the friction material in the brake.

While in accord with the patent statutes one embodiment of the invention has been specifically illustrated and described, it is to be particularly understood that the invention is not to be limited thereto or thereby, but that the scope of the invention is defined in the appended claims.

I claim:

1. A vehicle brake comprising a stationary bracket including a pair of circumferentially-spaced, radially-directed arm portions, a rotary disc positioned closely adjacent the arm portions and of a radius slightly smaller than the arm portions, a pair of brake beams, one on each side of the disc, one of said beams being slidably supported on the arm portions for movement toward and from the disc, resilient means normally spacing the beams apart, hydraulically-operated means connecting one end of the pair of brake beams together and adapted to move the said ends of the pair of beams toward each other, means connecting the other ends of the brake beams together, cam means for operating said connecting means to move the said other ends of the beams toward each other to serve as a parking brake, means adjacent the center of each beam for holding a substantially round body of friction material adjacent the disc, said means including a plug threaded in the beam, teeth on the periphery of the plug, pawls engaging with the teeth, crank means, a sliding pin positioned between the brake beam ends and connected to the crank means, and links connecting the crank means to the pawls to effect rotation of the plugs to move the friction bodies towards the disc when the beam ends move together more than the proper spacing.

2. A vehicle brake comprising a stationary bracket adapted to be mounted on the vehicle axle and including a pair of circumferentially-spaced, radially-directed arm portions relative to the axle, rotary disc adapted to be mounted on the vehicle wheel and positioned closely adjacent the arm portions and of a radius slightly smaller than the arm portions, a pair of brake beams, one on each side of the disc, one of said beams being slidably supported on the arm portions for movement toward and from the disc, hydraulically-operated means connecting one end of the pair of brake beams together and adapted to move the said ends of the pair of beams to and from each other, means connecting the other ends of the brake beams together, cam means independent of the hydraulically-operated means for operating said connecting means to move the said other ends of the beams to and from each other to serve as a parking brake, the means and cam means retaining the other ends of the brake beams in their spaced relationship upon actuation of the hydraulically operated means, and means adjacent the center of each beam for holding a substantially round body of friction material adjacent the disc.

3. A vehicle brake comprising a stationary bracket adapted to be mounted on the vehicle axle and including a pair of circumferentially-spaced, radially-directed arm portions relative to the axle, the arm portions forming an included angle therebetween of appreciably less than 180°, a rotary disc adapted to be mounted on the vehicle wheel and positioned closely adjacent the arm portions and of a radius slightly smaller than the arm portions, a pair of brake beams, one on each side of the disc, one of said beams being slidably supported on the arm portions for movement toward and from the disc, hydraulically-operated means connecting one end of the pair of brake beams together and adapted to move the said ends of the pair of beams to and from each other, means connecting the other ends of the brake beams together, and means adjacent the center of each beam for holding a substantially round body of friction material adjacent the disc.

4. A vehicle brake comprising a stationary bracket including a pair of circumferentially-spaced, radially-directed arm portions, a rotary disc positioned closely adjacent the arm portions and of a radius slightly smaller than the arm portions, a pair of brake beams, one on each side of the disc, one of said beams being slidably supported on the arm portions for movement toward and from the disc, hydraulically-operated means connecting one end of the pair of brake beams together and adapted to move the said ends of the pair of beams to and from each other, means connecting the other ends of the brake beams together, means adjacent the center of each beam for holding a substantially round body of friction material adjacent the disc, said means including a plug threaded in the beam, teeth on the periphery of the plug, pawls engaging with the teeth, a crank, a pin positioned between the brake beam ends and connected to the crank, and links connecting the crank to the pawls to effect rotation of the plugs to move the friction bodies towards the disc when the beam ends move together more than the proper spacing.

5. A vehicle brake comprising a stationary bracket adapted to be mounted on the vehicle axle and including arm portions directed radially relative to the vehicle axle, a rotary disc adapted to be mounted on the vehicle wheel and positioned closely adjacent the arm portions and of a radius slightly smaller than the arm portions, a pair of brake beams, one on each side of the disc, one of said beams being slidably supported on the arm portions for movement toward and from the disc, means connecting one end of the pair of brake beams together and adapted to move the said ends of the pair of beams to and from each other, means connecting the other ends of the brake beams together, means adjacent the center of each beam for holding a substantially round body of friction material adjacent the disc, and means carried by the brake beams connected to and energized by the first-named means upon actuation thereof to advance the body of friction material towards the disc and control the position of the friction material in the beams.

6. A vehicle brake comprising a stationary bracket including radially-directed arm portions, a rotary disc positioned closely adjacent the arm portions and of a radius slightly smaller than the arm portions, a pair of brake beams, one on each side of the disc, one of said beams being slidably supported on the arm portions for movement toward and from the disc, means connecting one end of the pair of brake beams together and adapted to move the said ends of the pair of beams to and from each other, means connecting the other ends of the brake beams together, means adjacent the center of each beam for holding a substantially round body of friction material adjacent the disc, said means including a plug threaded in the beam, teeth on the periphery of the plug, pawls engaging with the teeth, a crank operated by the brake beam ends, and links connecting the crank to the pawls to effect rotation of the plugs to move the friction bodies toward the disc when the beam ends move together more than the proper spacing.

7. A vehicle brake comprising a stationary bracket including radially-directed arm portions, a rotary disc positioned closely adjacent the arm portions and of a radius slightly smaller than the arm portions, a pair of brake beams one on each side of the disc, one of said beams being slidably supported on the arm portions for movement toward and from the disc, means connecting one end of the pair of brake beams together and adapted to move the said ends of the pair of beams to and from each other, means connecting the other ends of the brake beams together, means adjacent the center of each beam for holding a substantially round body of friction material adjacent the disc, said means including a plug threaded in the beam, teeth on the periphery of the plug, and linkage operated by the movement of the brake beam ends together to effect rotation of the plugs to move the outer surface of the friction bodies substantially to their initial clearance position relative to the disc.

8. A vehicle brake including a rotary disc, a pair of brake beams, one being positioned on each side of the disc, the ends of the beams extending beyond the periphery of the disc, hydraulic means at one end of the beams for moving the center portion of the beams into engagement with the disc, mechanically actuated cam means at the other end of the beams for moving the center portions of the beams into engagement with the disc to effect parking brake action, friction plugs adjustably carried near the center of the brake beams, screw means controlling the position of the friction plugs in the beams, and means positioned between the beams and operated by movement of the beam ends too closely together for controlling the position of the screw means.

9. A vehicle brake including a rotary disc, a pair of brake beams, one being positioned on each side of the disc, the ends of the beams extending beyond the periphery of the disc, hydraulic means at one end of the beams for moving the center portion of the beams into engagement with the disc, mechanically actuated means at the other end of the beams for moving the center portions of the beams into engagement with the disc to effect parking brake action, friction plugs adjustably carried near the center of the brake beams, and screw means controlling the position of the friction plugs in the beams.

10. A vehicle brake including a rotary disc, a pair of brake beams, one being positioned on each side of the disc, the ends of the beams extending beyond the periphery of the disc, hydraulic means at one end of the beams for moving the center portion of the beams into engagement with the disc, and mechanically actuated cam means at the other end of the beams for moving the center portions of the beams into engagement with the disc to effect parking brake action.

11. A vehicle brake including a rotary disc, a pair of brake beams, one being positioned on each side of the disc, the ends of the beams extending beyond the periphery of the disc, means at one end of the beams for moving the center portion of the beams into engagement with the disc, means at the other end of the beams for moving the center portions of the beams into engagement with the disc to effect brake action, friction plugs adjustably carried near the center of the brake beams, and means including a carrier sleeve threadably engaging a brake beam and controlled by the clearance between the beams for periodically advancing the friction plugs towards the disc as the surfaces of the plugs wear in use.

12. A vehicle brake including a rotary disc, a pair of brake beams, one being positioned on each side of the disc near its outer periphery, the ends of the beams extending beyond the periphery of the disc, a spot of friction means carried by each beam adjacent its center and adapted to engage with the opposite sides of the disc, a stationary bracket of approximately one quadrant in circumferential extent engaging and supporting the brake beams at the ends thereof, and independent means for individually moving either ends of the brake beams towards each other to effect a braking action.

13. In combination, an axle housing, a wheel rotatably mounted in association with the axle housing, a brake disc rotatively carried with the wheel and mounted for limited axial movement thereon, alignment means fixedly mounted on the axle housing, resilient means holding the brake disc against the alignment means, and brake mechanism supported on the axle housing and adapted to engage with both sides of the brake disc.

14. In combination in a brake, a floating disc, brake mechanism adapted to apply braking pressure to both sides of the disc, means mounting the disc and brake mechanism in relatively rotary relation, said mounting means including a rigid support member for the brake mechanism, a rigid, stationary alignment member carried by the support member for the brake mechanism, means resiliently holding the disc against the alignment member, and anti-friction means between the disc and the alignment member.

15. In combination, a brake disc, a pair of brake beams, one beam being positioned on each side of the disc, means associated with the beams for moving the beams toward each other to effect a braking action, a body of friction material positioned on each beam, screw means mounting the body of friction material on each beam, pawl and ratchet means for controlling the position of the screw means, and linkage means controlled by the clearance between the beams for operating the pawl and ratchet means to advance the screw means and to reestablish a desired clearance between the disc and the bodies of friction material upon wear of the bodies of friction material.

16. A vehicle brake comprising a stationary bracket adapted to be mounted on the vehicle axle and including at least one arm portion directed radially relative to the vehicle axle, a rotary disc adapted to be mounted on the vehicle wheel and positioned closely adjacent the arm portion and of a radius slightly smaller than the arm portion, a pair of brake beams, one on each side of the disc, one of said beams being slidably supported on the arm portion for movement towards and from the disc, means connecting one end of the pair of brake beams together and adapted to move the said ends of the pair of beams to and from each other, means connecting the other ends of the brake beams together and retaining same normally in spaced relation even upon actuation of the first-named means, and means adjacent the center of each beam for holding a body of friction material adjacent the disc.

17. A vehicle brake including a rotary disc, a pair of brake beams positioned in opposed relation, one being positioned on each side of the disc, the ends of the beams extending beyond the periphery of the disc, a block of friction material carried by each beam near its center, said blocks being adapted to engage opposite sides of the disc near its periphery, hydraulic means securing the beams together at one end thereof and for moving said one ends of the beams together to tilt the beams about the other ends thereof to squeeze the center portions of the beams into normal braking engagement with the disc, independently operable cam means securing the said other ends of the beams together and adapted to move said other ends of the beams together to tilt the beams about the hydraulic means and squeeze the disc with the center of the beams in a parking brake action.

18. In combination, an axle housing, a wheel rotatively journaled in association with the housing, a brake disc carried by the wheel, a brake beam positioned on each side of the disc, rigid means on the axle housing non-rotatively supporting the brake beams for movement towards and from the disc, aligning means carried by the rigid means on the axle housing, means resiliently holding the brake disc against the aligning means, and means for moving at least one adjacent and opposed ends of the brake beams together to effect a braking action.

19. In combination, an axle housing, a wheel rotatively journaled in association with the housing, a brake disc carried by the wheel, a brake beam positioned on each side of the disc, means on the axle housing non-rotatively supporting one beam for resiliently positioned movement toward and from the disc, means non-rotatively mounting the second beam on the ends of the first beam and resiliently positioning the second beam with respect to the first, and means for moving the brake beams together at one end to effect a braking action.

JESSE G. HAWLEY.

REFERENCES CITED

The following references are of record in the file of this patent:

UNITED STATES PATENTS

| Number | Name | Date |
|---|---|---|
| 263,083 | Woolson | Aug. 22, 1882 |
| 1,527,798 | Hawley | Feb. 24, 1925 |
| 1,843,490 | Spase | Feb. 2, 1932 |
| 1,959,049 | Buus | May 15, 1934 |
| 1,986,123 | Sharar | Jan. 1, 1935 |
| 1,995,135 | Williams et al. | Mar. 19, 1935 |
| 2,016,359 | Corbin | Oct. 8, 1935 |
| 2,048,420 | Babel | July 21, 1936 |
| 2,068,956 | La Brie | Jan. 26, 1937 |
| 2,285,257 | Dodge | June 2, 1942 |
| 2,291,016 | Aurien | July 28, 1942 |
| 2,319,231 | Hawley | May 18, 1943 |
| 2,326,961 | McCune | Aug. 17, 1943 |
| 2,366,093 | Forbes | Dec. 26, 1944 |
| 2,375,566 | Lipps | May 8, 1945 |